United States Patent [19]

Tiba et al.

[11] Patent Number: 4,748,230

[45] Date of Patent: May 31, 1988

[54] PREPARATION OF RESIN FROM PHENOLIC AND OXAZOLINE USING PHOSPHINE CATALYST

[75] Inventors: Omar Tiba, Dublin; Billy M. Culbertson, Worthington; Marvin L. Deviney, Worthington; Anil B. Goel, Worthington, all of Ohio

[73] Assignee: Ashland Oil, Inc., Ashland, Ky.

[21] Appl. No.: 30,799

[22] Filed: Mar. 27, 1987

[51] Int. Cl.⁴ .............................................. C08G 69/00
[52] U.S. Cl. .................................... 528/211; 525/504; 528/141; 528/163
[58] Field of Search ....................... 528/211, 141, 163; 525/504

[56] References Cited

U.S. PATENT DOCUMENTS 4,613,662 9/1986 Goel .................................... 528/211

Primary Examiner—Harold D. Anderson
Attorney, Agent, or Firm—John F. Jones

[57] ABSTRACT

A process for the copolymerization of bis-2-oxazolines and polyphenolic compounds at greatly improved rates comprising carrying out the copolymerization in the presence of from about 0.5 to about 5% by weight of a phosphine catalyst is described.

8 Claims, No Drawings

PREPARATION OF RESIN FROM PHENOLIC AND OXAZOLINE USING PHOSPHINE CATALYST

This invention relates to an improved process for the production of thermoplastic and thermoset polymeric compositions by carrying out the reaction of a compound containing a plurality of oxazoline groups with a phenol or phenolic resin containing a plurality of aromatic hydroxyl groups in the presence of a catalytic amount of a phosphine.

The present invention is an improvement on the process for preparing interpolymers of bisoxazolines and polyphenolic compounds disclosed and claimed in U.S. Pat. No. 4,430,491 which is commonly assigned and is incorporated herein by reference. The prior art polymerization process discloses that the reaction requires about one hour to gel time and about 20 hours post curing time to prepare the desired resins. We have discovered that the use of catalytic amounts of various phosphines in the polymerization reaction substantially reduces the gel and post curing times for the reaction.

The use of phosphites as catalysts for promotion of the reaction of bisoxazolines with dibasic acids and with aromatic carboxylic acid - hydroxy compounds has been disclosed in European Patent publication No. 014345 A2 and the use of phosphite esters for catalysts of the reaction of bisoxazolines with phenolic materials is disclosed and claimed in commonly assigned U.S. patent application Ser. No. 880,477, filed on 6/30/86.

The use of phosphines as catalysts for the reaction between bisoxazolines and polyphenolic compounds to form thermoplastic and thermoset polymers has not heretofore been disclosed. We have also discovered that the extent of the catalytic effect in this particular polymerization reaction is influenced to some extent by the nature of the substituents on the aromatic residues attached to the preferred phosphine moiety of the catalysts of this invention.

The phosphine catalysts embodied in the present invention include trialkyl, triaryl, alkyl-aryl, substituted triaryl, substituted triaryl, and substituted trialkyl phosphines as catalysts. The phosphine catalysts preferred for use in this invention are those having the formula $R_3P$ wherein the R independently can represent an alkyl group having from 1 to 30 carbon atoms or an aryl group having from 6 to 14 carbon atoms and any or all of these groups may have substituents on them including halogen (chlorine, fluorine, bromine or iodine), cyano, nitro, ester, hydroxyl, phenolic hydroxyl and the like.

The oxazolines useful in the practice of this invention include a variety of such compounds having at least two 2-oxazoline groups. These oxazolines must be devoid of other functional groups capable of reacting in any manner with either an oxazoline group or an aromatic hydroxyl group. From the standpoint of potential commercial availability in commodity proportions the oxazolines derived from polycarboxylic acids are preferred. Such polycarboxylic acids include the aromatic acids; e.g., isophthalic acid, terephthalic acid, 5-t-butylisophthalic acid, trimesic acid trimethyl-3-phenylindan-4',5-dicarboxylic acid and 2,6-naphthalene dicarboxylic acid. The polyfunctional oxazoline compounds useful in this invention can be conveniently prepared by the reaction of the corresponding esters of a polyacid and ethanolamines.

Specific polyoxazolines useful in the practice of this invention include particularly the bisoxazolines such as 4,4',5,5'-tetrahydro-2,2'-bisoxazole, 2,2'-bis(2-oxazoline); a 2,2'-(alkanediyl) bis [4,5-dihydrooxazole], e.g., 2,2 1,4-butanediyl) bis [4,5-dihydrooxazole] and 2,2'-(1,2-ethanediyl) bis [4,5-dihydrooxazole]; a 2,2'-(arylene) bis [4,5-dihydrooxazole]; e.g., 2,2'-(1,4-phenylene) bis [4,5-dihydrooxazole], 2,2'-(1,5-naphthalenyl) bis [4,5-dihydrooxazole], 2,2'-(1,3-phenylene) bis [4,5-dihydrooxazole], and 2,2'-(1,8-anthracenyl) bis [4,5-dihydrooxazole]; a sulfonyl, oxy, thio or alkylene bis 2-(arylene) [4,5-dihydrooxazole], e.g., sulfonyl bis 2-(1,4-phenylene) [4,5-dihydrooxazole], oxy bis 2,2'-(1,4-phenylene) [4,5-dihydrooxazole], thio bis 2,2'-(1,4-phenylene) [4,5-dihydrooxazole]and methylene bis 2,2'-(1,4-phenylene) [4,5-dihydrooxazole]; a 2,2',2"-(1,3,5-arylene) tris [4,5-dihydrooxazole], e.g., 2,2',2"-tris [4,5-dihydrooxazole]1,3,5-benzene; a poly [(2-alkenyl) 4,5-hydrooxazole], e.g., poly[2-(2-propenyl) 4,5-dihydroxazole], and others.

The polyphenolic compounds useful in this invention are those compounds having two or more aromatic hydroxyl groups per molecule and these compounds include bisphenols, various benzene and fused aromatic ring diols and triols, e.g., 1,4-benzene diol (hydroquinone), 1 3-benzene diol (resorcinol), 1,4-naphthalene diol and 1,3,5-benzene triol; the biphenyl diols, e.g., [1,1'-biphenyl]-2,2'-diol; the alkylene and cycloalkylene bisphenols, e.g., 2,2'-methylene bisphenol, 4,4'-(1-methylethylidene) bisphenol (Bisphenol A), 4,4'-(phenylmethylene) bisphenol, 4 4'-(cyclohexanediyl) bisphenol, 4,4'-(1 2-diethyl-1 2-ethendiyl) bisphenol and 3,4-bis(4-hydroxyphenyl)-2,4-hexadiene; the arylene bisphenols, e.g., 4 4'-phenylene bisphenol; the oxy, thio and sulfonyl bisphenols, e.g., 2,3-oxybisphenol, 4,4'-thiobisphenol and 2 2'-sulfonyl bisphenol; the bis (hydroxyaryl) alkanones, e.g., bis (4-hydroxyphenyl) methanone, 1,5-dihydroxy-9,10-anthracenedione and 4-[bis(4-hydroxyphenyl) methylene]-2,5-cyclohexadiene-1-one; the various benzamide and benzoate derivatives, e.g., 2-hydroxy-N-(4-hydroxyphenyl) benzamide, 4-hydroxy-4-hydroxyphenyl benzoate, 2-methyl-2[(4-hydroxybenzoyloxymethyl]-1,3-propanediyl-4-hydroxybenzoate, bis (4-hydroxy benzoate)-1,2-ethanediyl; 2-(4-hydroxy benzoate) ethyl ether, bis (4-hydroxy benzamide)-1,6-hexanediyl and bis (4-hydroxy benzamide)-1,4-benzenediyl.

The oxaxolines and polyphenolic compounds useful in this invention can also contain substituent groups which do not react with either phenols or oxazolines and such substituent groups include alkyl, aryl, halo, cyano, nitro, alkoxy, aryloxy alkyl sulfides, aryl sulfides, amine and alkyl or aryl substituted amine, amide and ester groups and the like.

In addition to the phenolic compounds noted above as being useful in this invention there are a variety of oligomers containing a plurality of phenolic residues which are also useful in this invention. particularly representative of such oligomers are the base or acid catalyzed phenol formaldehyde condensation products preferably the novolacs. Besides the conventional resoles, the phenolic resins characterized in having benzylic ether linkages prepared by metal ion catalysis as disclosed in U.S. Pat. No. 3,485,797 are also useful. Other suitable polyphenol oligomers include the addition polymers and copolymers of a vinyl, isopropenyl and allyl substituted phenol; e.g., 4-ethenylphenol, p- isopropenylphenol, 2-allylphenol, 2-methallylphenol, and the like.

The process of this invention can be carried out at temperatures in the range of from about 140 to 275° C. In preparing the thermoset polymeric compositions according to the process of this invention the preferred stoichiometry is on an equimolar basis of oxazoline to phenolic compound. Suitable stoichiometric ratios in the preparation of the oxazoline compound per equivalent of the phenolic reactant but the weight ratio of oxazoline to phenol can be varied from 0.15 to 9%. The phosphine catalyst should be present in the polymerization reaction mixture in from about 0.5 to 5 percent by weight of the reactants.

This invention is further illustrated in the following representative examples.

EXAMPLES 1-8

Copolymerization of 1,3-phenylene bisoxazoline with the phenol-formaldehyde resin (Alnovol), designated PN 320 (American Hoechst), in the weight ratio of 40:60, respectively, without and with various catalysts were carried out. The reaction to gel of the mixture was carried out at 175° C. for the designated time and after gel the material was post cured at 225° C. for 2 hours (except in the case of Example 8 in which the post cure time was 20 hours). In each Example the final post cured polymer was measured for Tg (degrees C.). The catalysts used and results obtained are given in the following Table. Example 8 was run without catalyst for the purpose of comparison with the prior art and thus is outside the scope of the present invention.

TABLE

| EXAMPLE | CATALYST | GEL TIME MINUTES | Tg (°C.) |
|---|---|---|---|
| 1 | (1%) Tri(p-chlorophenyl) Phosphine | 19.0 | 163.0 |
| 2 | (1%) Tri-(p-fluorophenyl) Phosphine | 20.0 | 156.3 |
| 3 | (3%) Tri(p-fluorophenyl) Phosphine | 18.0 | 154.0 |
| 4 | (1%) Triphenyl Phosphine | 30.0 | 155.4 |
| 5 | (3%) Triphenyl Phosphine | 23.0 | 151.19 |
| 6 | (1%) Tri-n-Butyl Phosphine | 27.0 | 154.7 |
| 7 | (3%) Tri-n-Butyl Phosphine | 22.0 | 154.6 |
| 8 | None | 1 (hr) | 149 |

We claim:

1. The process for the preparation of a polymeric composition comprising copolymerizing a mixture of a polyoxazoline and a polyphenolic compound in the presence of from about 0.5 to 5% by weight of a phosphine catalyst having the formula $R_3P$ wherein R independently represents an alkyl group having from 1 to 30 carbon atoms or an aryl group having from 6 to 14 carbon atoms or said R groups are independently substituted with at least one member selected from the group consisting of halogen, cyano, nitro, ester, hydroxyl, and phenolic groups at a temperature in the range of from about 140° C. to about 230° C.

2. The process of claim 1 wherein the polyoxazoline is a compound having at least two 2-oxazoline groups per molecule.

3. The process of claim 2 wherein the polyphenolic compound is one having two or more aromatic hydroxyl groups per molecule.

4. The process of claim 3 wherein the polyoxazoline is 1,3-phenylene bisoxazoline.

5. The process of claim 4 wherein the polyphenolic compound is a phenol-formaldehyde resin.

6. The process of claim 5 wherein the phosphine catalyst is tri(p-chloro phenyl) phosphine.

7. The process of claim 5 wherein the phosphine catalyst is triphenyl phosphine.

8. The process of claim 5 wherein the phosphine is tri-n-butyl phosphine.

* * * * *